United States Patent
Vidal (10) Patent No.: US 6,941,968 B2
(45) Date of Patent: Sep. 13, 2005

(54) FLUID SPIGOT AND FILTER UNIT (75) Inventor: Freddy Vidal, Chatsworth, CA (US)

(73) Assignee: QMP, Inc., Sun Valley, CA (US)

( * ) Notice: Subject to any disclaimer, the term of this patent is extended or adjusted under 35 U.S.C. 154(b) by 177 days.

(21) Appl. No.: 10/393,064

(22) Filed: Mar. 20, 2003

(65) Prior Publication Data

US 2004/0182457 A1 Sep. 23, 2004

(51) Int. Cl.$^7$ ................................................. F16T 1/45
(52) U.S. Cl. ........................................ 137/544; 137/801
(58) Field of Search ........................... 137/544, 549, 137/801

(56) References Cited

U.S. PATENT DOCUMENTS

| | | | | |
|---|---|---|---|---|
| 1,958,073 A | * | 5/1934 | Seidel | 210/251 |
| 2,331,729 A | * | 10/1943 | Rice | 137/210 |
| 4,207,916 A | * | 6/1980 | Hayes | 137/171 |
| 5,510,031 A | * | 4/1996 | Knauf et al. | 210/460 |
| 5,823,229 A | * | 10/1998 | Bertrand et al. | 137/614.2 |
| 6,394,127 B1 | * | 5/2002 | Creswell et al. | 137/544 |
| 6,532,982 B2 | * | 3/2003 | Downer | 137/15.08 |

* cited by examiner

Primary Examiner—John Fox
(74) Attorney, Agent, or Firm—Christie, Parker & Hale, LLP (57) ABSTRACT A fluid spigot with a spigot body, a spigot tube, a rotary disc valve located in a valve cavity in the spigot body, the rotary disc valve having an opened and closed positions, a valve stem for turning the rotary disc valve, and a handle for turning the valve stem. The invention further provides a filter unit for attachment to a water spigot or faucet. The filter unit has a filter cannister with a hollow body with a fluid inlet and an open mouth portion, a filter sized to fit within the filter cannister, and an adapter that fits over the open mouth portion of the filter canister, wherein the filter cannister is sized to fit through a hole in a sink rim, the filter being replaceable from above the sink by removing the adapter to access the filter.

9 Claims, 7 Drawing Sheets

FIG. 16

FLUID SPIGOT AND FILTER UNIT

BACKGROUND OF THE INVENTION

The invention relates to a new fluid spigot design, and more particularly to a spigot design that utilizes a disc valve design to simplify the construction of the spigot design, as well as a a filter unit that can be used in an in sink rim hole and the like, used in combination with the fluid spigot design or other water spigots and faucets.

With growing concern about water quality, many individuals prefer not to drink tap water unless it is first filtered. There exists a variety of different filtration systems including reverse osmosis systems, activated carbon filtration systems, distillation systems, activated metal particle filtration systems and the like. Some of these systems have a portion that sits on the user's countertop. Some of these systems attach directly to a user's water faucet, and some systems are located undercounter below a sink or outdoors. In the case of undercounter filtration systems which are located below a sink surface, replacing the filter, which is recommended in many systems every three to six months, requires the user to go under the sink, typically remove many items from under the sink, remove a filtration cannister, and replace the filter. Since the workspace under a sink can be limited, it can sometimes be difficult to easily access a filter cannister.

In the case of hot or filtered water spigots, water spigot designs typically have a water spigot body, a water outlet nozzle, some type of valve located within the spigot body, and a handle or lever to operate the hot water.

It would be desirable to have an improved water spigot designed that has an inexpensive to manufacture yet highly reliable valve design. It would also be desirable to have a water filter that permits a user to replace a filter located below a sink from above the sink.

SUMMARY OF THE INVENTION

The invention provides a fluid spigot, comprising:

a spigot body having a valve stem tunnel, a fluid outlet tunnel, a valve cavity, and an opening between the fluid outlet tunnel and the valve cavity;

a rotary disc valve, comprising a first portion and a second portion, the first portion having at least one aperture formed therethrough, the second portion having a blocking region that will cover the at least one aperture in the first portion when the first and second portions are in a first, closed orientation, with the region at least partially uncover the at least one aperture in the first portion when the first and second portions are in a second, opened orientation, the rotary disc valve being located in the valve cavity;

a valve stem that is inserted into the valve seat cavity and through the valve stem tunnel, the valve stem having an upper, turning end and a lower engagement end which engages with and can turns one of the first and second portions of the rotary disc valve; and a handle that engages with the upper, turning end of the valve stem.

The invention further provides a fluid spigot, comprising:

a spigot body having a valve stem tunnel, a fluid outlet tunnel, a valve cavity, and an opening between the fluid outlet tunnel and the valve cavity;

a rotary disc valve, comprising a first portion and a second portion, the first portion having at least one aperture formed therethrough, the second portion having a blocking region that will cover the at least one aperture in the first portion when the first and second portions are in a first, closed orientation, with the region at least partially uncover the at least one aperture in the first portion when the first and second portions are in a second, opened orientation, the rotary disc valve being located in the valve cavity;

a valve stem that is inserted into the valve seat cavity and through the valve stem tunnel, the valve stem having an upper, turning end and a lower engagement end which engages with and turns one of the first and second portions of the rotary disc valve;

a handle that engages with the upper, turning end of the valve stem; and a spigot tube that is inserted into the fluid outlet tunnel.

In another aspect, the invention provides a fluid spigot, comprising:

a spigot body having a valve stem tunnel, a fluid outlet tunnel, a valve cavity, and an opening between the fluid outlet tunnel and the valve cavity;

a rotary disc valve, comprising a first portion and a second portion, the first portion having at least one aperture formed therethrough, the second portion having a blocking region that will cover the at least one aperture in the first portion when the first and second portions are in a first, closed orientation, with the region at least partially uncover the at least one aperture in the first portion when the first and second portions are in a second, opened orientation, the rotary disc valve being located in the valve cavity;

a valve stem that is inserted into the valve seat cavity and through the valve stem tunnel, the valve stem having an upper, turning end and a lower engagement end which engages with and turns one of the first and second portions of the rotary disc valve;

a handle that engages with the upper, turning end of the valve stem;

a spigot tube that is inserted into the fluid outlet tunnel; and a filter unit with a filter cannister with a hollow body with a fluid inlet and an open mouth portion, a filter sized to fit within the filter cannister, and an adapter that fits over the open mouth portion of the filter canister and has an engagement for removable attachment to the spigot body.

In yet another aspect, the invention provides a combination fluid spigot and water filter, comprising:

a spigot body;

a valve located in the spigot body;

a valve activation handle;

a spigot tube that extends from the spigot body; and a filter unit, the filter unit having a filter cannister with a hollow body with a fluid inlet and an open mouth portion, a filter sized to fit within the filter cannister, and an adapter that fits over the open mouth portion of the filter canister, wherein the filter cannister is sized to fit through a hole in a sink rim, the filter being replaceable from above the sink by removing the adapter to access the filter.

In a further aspect, the invention provides a filter unit for attachment to a water faucet, the filter unit having a filter cannister with a hollow body with a fluid inlet and an open mouth portion, a filter sized to fit within the filter cannister, and an adapter that fits over the open mouth portion of the filter canister, wherein the filter cannister is sized to fit through a hole in a sink rim, the filter being replaceable from above the sink by removing the adapter to access the filter.

DETAILED DESCRIPTION OF THE INVENTION

Figures 1, 13, 14:
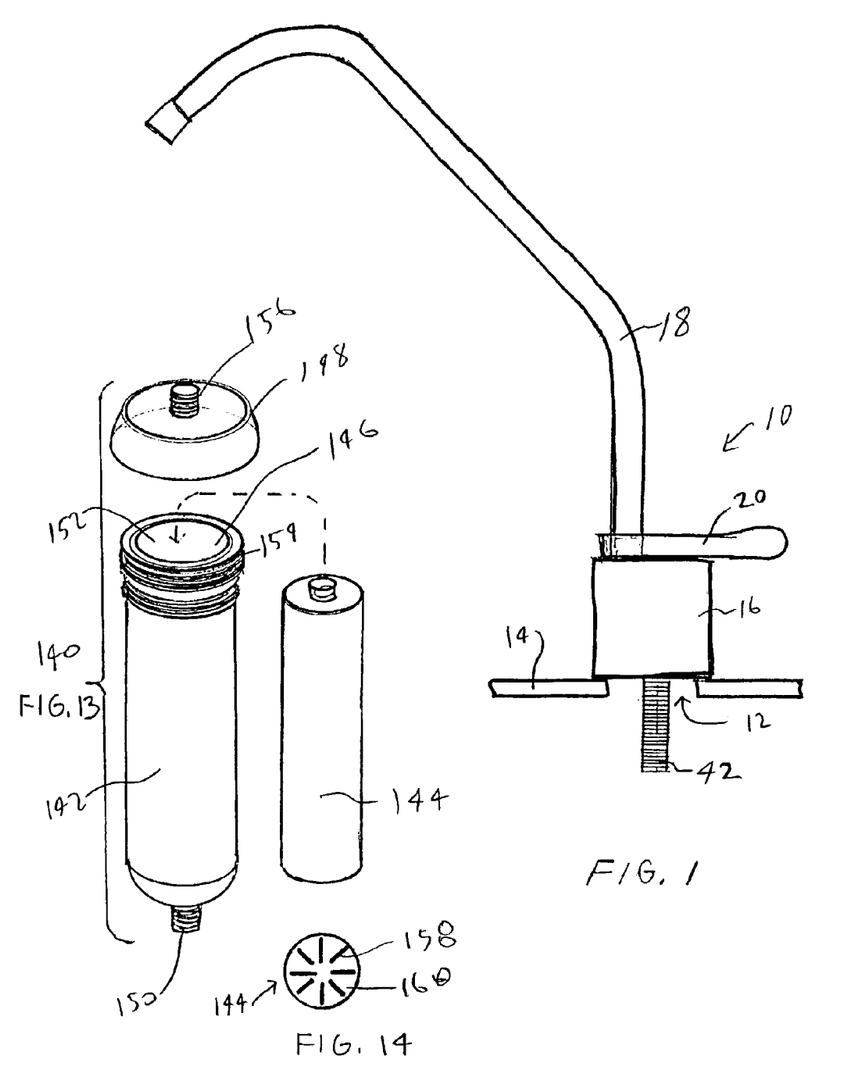
FIG. 1 is a side view of an exemplary fluid spigot of the invention placed in a sink rim hole.
FIG. 13 is a perspective dissembled view of an exemplary filter unit showing its filter, a filter cannister and an adapter.
FIG. 14 is a bottom plan view of the filter of FIG. 13.

For the detailed description of the invention turning to FIG. 1, there is shown a side view of an exemplary fluid spigot 10 inserted through an opening 12 in a sink's rim 14, countertop or any other surface to which the fluid spigot 12 is attached. Fluid spigot has a spigot body 16, a spigot tube 18 and a handle 20. Extending from below spigot body 16 is a fluid supply adapter 42. Fluid supply threaded adapter 42 has a threaded shaft portion 106 through which fluid will pass.

Figure 2:
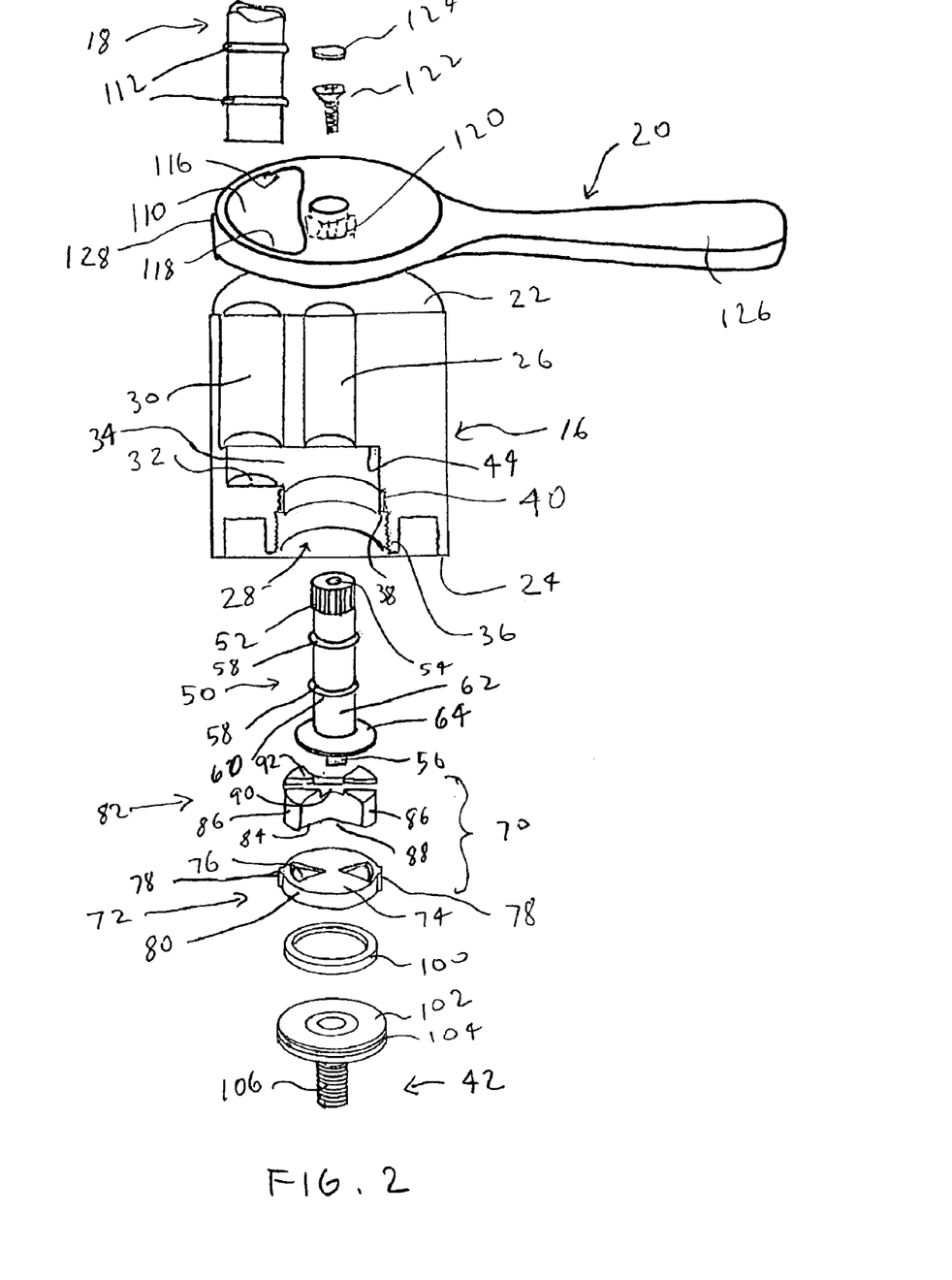
FIG. 2 is a combination exploded and partially exposed view of the exemplary spigot of FIG. 1.

FIG. 2 is a exploded and partially exposed view of the exemplary spigot body 16 of FIG. 1. Spigot body 16 has a top 22 and bottom 24. A valve stem tunnel 26 is formed through a top 22 of spigot body and extends into a valve cavity 28, which extends from bottom 24 of spigot body 16. A fluid outlet tunnel 30 is formed through top 22 of spigot body and extends downwardly to a fluid outlet tunnel end 32. There is an opening 34 formed between fluid outlet tunnel 30 and valve cavity 28 to permit fluid to flow from valve cavity 28 and out through fluid outlet tunnel 30. Valve cavity 28 has an engagement 36 which can comprise a threaded rim, and a seat 38 is formed in valve cavity. Within valve cavity a relief 40 can be formed therein. A valve stem 50 is provided and has an upper turning end 52, which can comprise knurls, and preferably has a screw hole 54. Valve stem 50 has a lower engagement end 56 and a collar 64. In order to provide a rotatable yet fluid type seal between valve stem 50 and the walls of valve stem tunnel 26, sealing means such as O-rings 58 can be placed in grooves 60 formed on valve stem shaft 62. A rotary disk valve 70 is provided, and has a first, disk shaped portion 72 with a flat upper face 74 with at least one aperture 76 formed therethrough. Protrusions 78 extend from a perimeter edge 80 of first portion. A second portion 82 has a flat lower face portion 84 and at least one region 86 (e.g., a lobe), which is sized to cover up at least one aperture 76 formed in first portion 72 when positioned thereover. In FIG. 2, the two lobes 86 are shown with reliefs 88 located therebetween. An engagement 90 is formed on a top surface 92 of second portion 82, and lower engagement end 56 of valve stem 50 is adapted to be non-rotatably engaged with engagement 90 of second portions 82 so that rotating valve stem 50 along its axial axis will rotate second portion 82 relative to first portion 72 and thereby move lobes 86 so that they either cover aperture 76 or uncover apertures 76. A gasket 100 is provided between first portion 72 (and seals on rim 38) and fluid supply for adapter 42 and seats on a collar portion 102 of fluid supply threaded adapter 42. Collar 102 has a thready perimeter 104 which threads into female threaded engagement 36 to hold all pieces together. Handle 20 has a handle aperture at 110 formed therethrough. It is through handle aperture 110 that spigot tube 18 is inserted into fluid outlet tunnel 30. Spigot tube 18 can preferably have sealing members 112, such as O-rings, positioned thereon to provide a water type yet turnable engagement of spigot tubing 18 relative to spigot body 16. Handle aperture 110 has an opening side 116 and a closing side 118. A handle 20 has a engagement 120 which is sized to engage with upper turning end 52 of valve stem 50 to retain handle 20 on valve stem 50. A set screw at 122 can be provided which screws through an opening in engagement 120 and into screw hole 54 of valve stem 50. A cover 124 can be used to cover up set screw 122. A handle will have a gripping portion 126 and optionally a rim portion 128 which extends from the opening side 116 to closing side 118.

Figure 3:
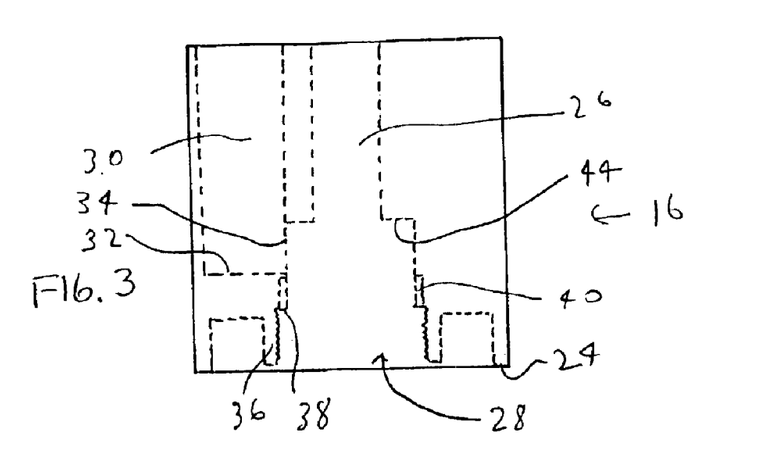
FIG. 3 is a side view of the exemplary spigot body of FIG. 1 and FIG. 2.
Figure 11:
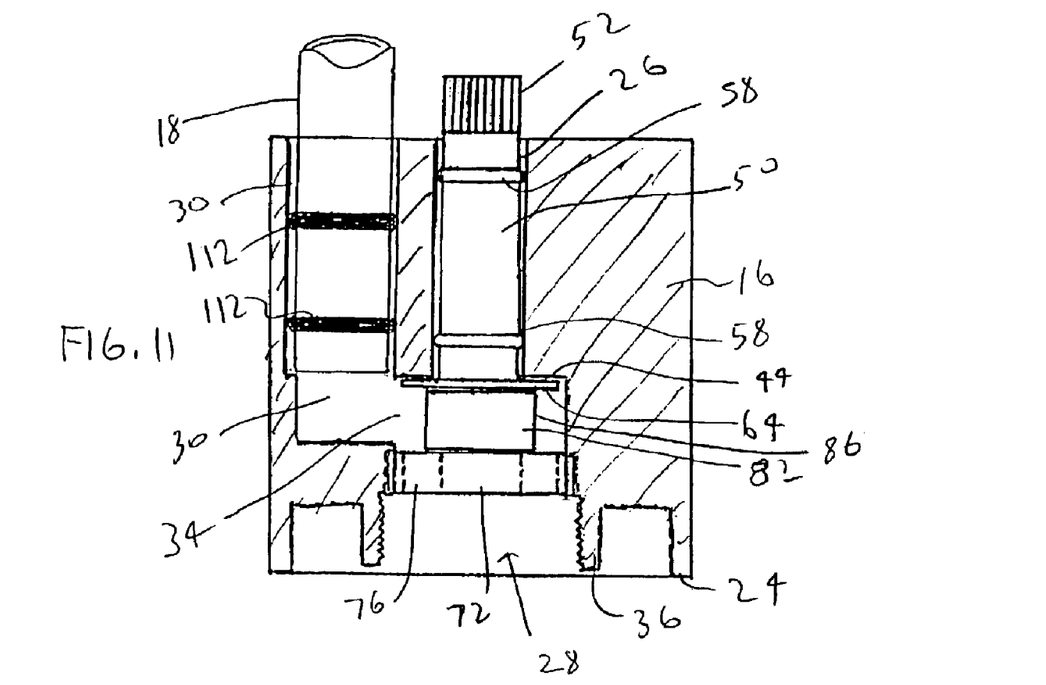
FIG. 11 is a partially exposed view of the exemplary fluid spigot with a rotary disk valve, valve stem and a portion of the spigot tube inserted therein, with the rotary disk valve in the opened position.
Figure 12:
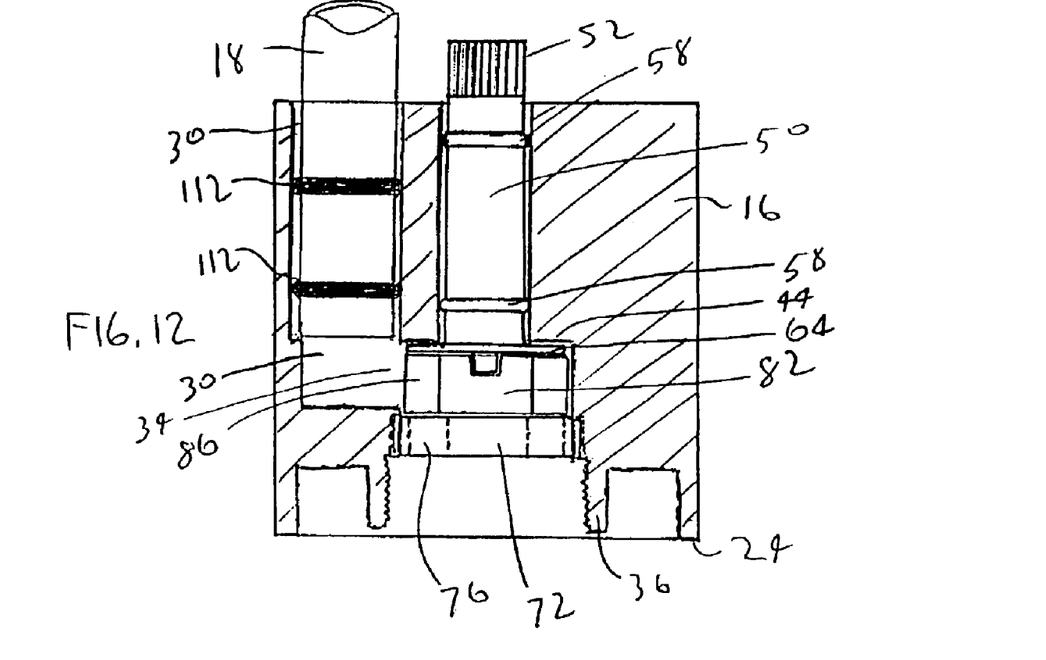
FIG. 12 is a similar view of FIG. 11, but with the rotary disk valve in the closed position.

Turning to FIG. 3, there is shown a side view of spigot body 16. It is shown with various portions thereof as previously described with respect to FIG. 2. At the interface between valve stem tunnel 26 and valve cavity 28, there is a collar seat 44 upon which collar 64 of valve stem makes contact (as shown in FIG. 11 and FIG. 12). Reliefs 40 can comprise slots formed in sidewalls of valve cavity and provide stops to retain protrusions 78 to prevent disk portion 72 from turning in valve cavity 28.

Figure 4:
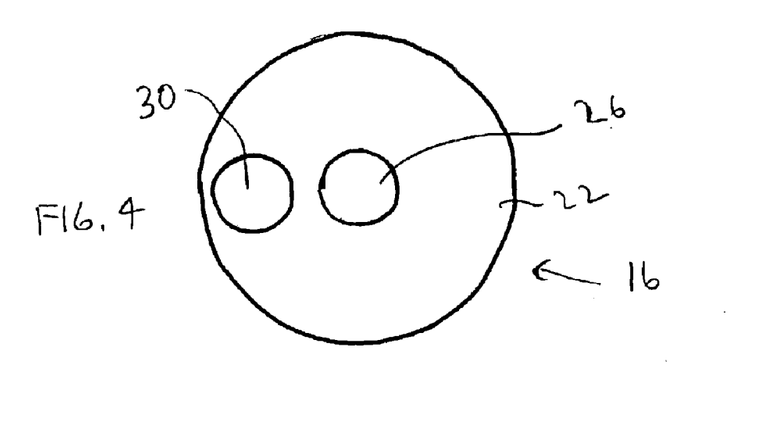
FIG. 4 is a top plan view of the exemplary spigot body of FIG. 1.

FIG. 4 is a top plan view of spigot body 16 and shows the valve stem tunnel 26 and fluid outlet tunnel 30 extending through top 22 thereof.

Figure 5:
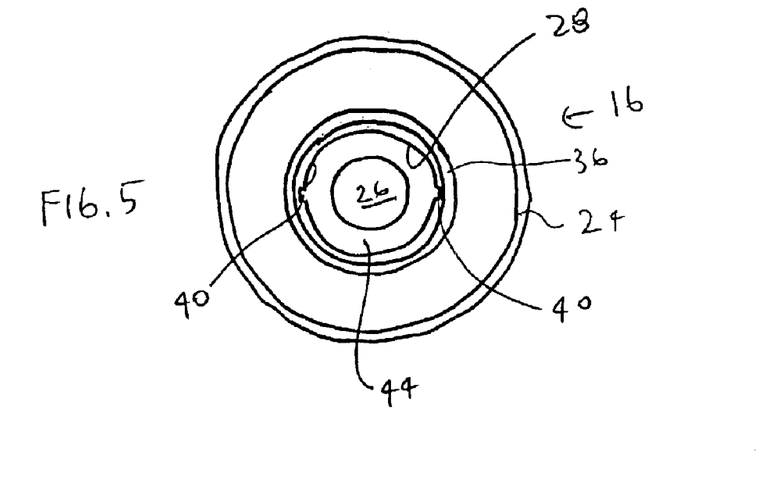
FIG. 5 is a bottom plan view of the exemplary spigot body of FIG. 1.

FIG. 5 is a bottom plan view of spigot body 16. Bottom 24 is shown along with threaded engagement 36 with reliefs 40 formed in walls of valve cavity 28. Collar seat 44 is shown along with valve stem tunnel 26.

Figure 6:
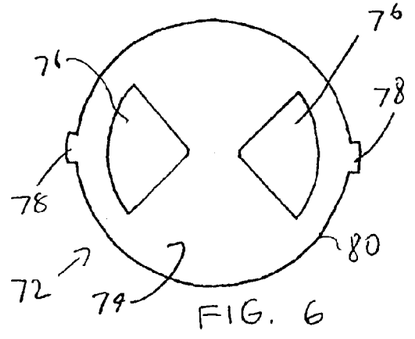
FIG. 6 is a top plan view of an exemplary first disk portion of an exemplary rotary disk valve used in the exemplary fluid spigot.

FIG. 6 is a top plan view of first portion 72, and shows its apertures 76, its protrusions 78 extending from perimeter edge 80 thereof.

Figure 7:
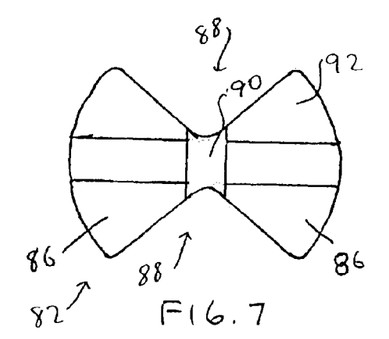
FIG. 7 is a top plan view of an exemplary second portion of the exemplary fluid disk valve using the exemplary spigot valve of FIG. 1.

FIG. 7 is a top plan view of second portion 82 and shows its lobes 86. Its reliefs 88, its engagement 90 and its top surface 92 are shown.

Figure 8:
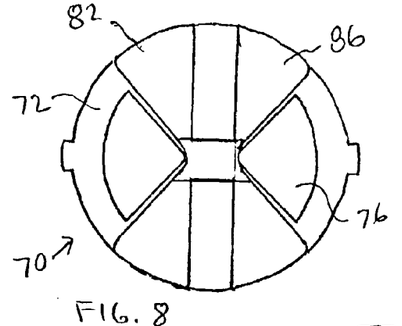
FIG. 8 is a top plan view showing the first and second portions of the exemplary rotary disk valve in the open position.

FIG. 8 is a top plan view showing second portion 82 placed on top of first portion 72, with lobes 86 moved to uncover apertures 76, which corresponds to the open position of the rotary disk valve 70.

Figure 9:
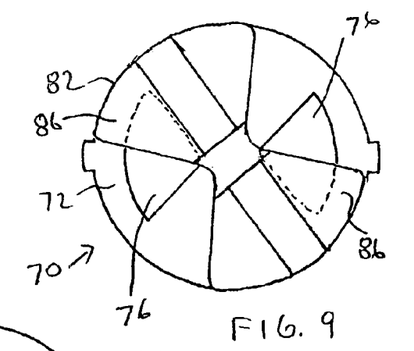
FIG. 9 is a top plan view of the exemplary rotary disk valve in a partially closed position.

FIG. 9 is a top plan view rotary disk valve 70, with second portion moved such that its lobes 86 are partially covering apertures 76 of first portion 72.

Figure 10:
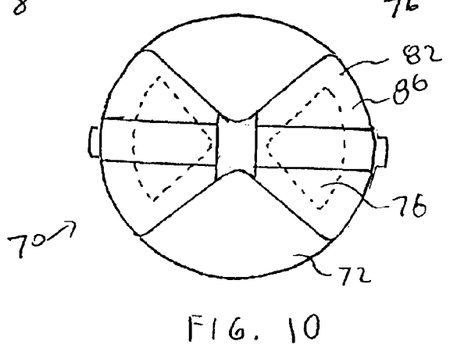
FIG. 10 is a top plan view of the exemplary rotary disk valve, but in a completely closed position.

FIG. 10 is a top plan view showing the rotary disk valve 70 in its closed position, with lobes 86 completely covering aperture 76. In closed position shown in FIG. 10, no fluid can flow through apertures 76. The first and second portions of rotary disk valve can preferably be made of hard, low friction corrosion resistant material, such as ceramics and for purposes of lowering the cost of manufacturing, can be selected from conventional ceramic valves used in other applications. Alternatively, a custom designed ceramic valve can be used. Although two apertures 76 and two lobes 86 are shown, a design with a single aperture and lobe, or even multiple lobes and apertures can be used.

Turning now to FIG. 11, there is shown a view of the partially assembled fluid spigot of FIG. 10, showing spigot body 16 revealed, with valve stem 50 inserted into valve stem tunnel 26 with its O-rings 58 forming watertight yet turnable seals with walls of valve stem tunnel 26, and shows collar 64 riding on collar seat 44. First portion 72 of rotary disk valve 70 is shown abutting collar 64 and is oriented such that it's lobes 86 are not blocking apertures 76 formed in first portion. Spigot tube 18 is inserted into fluid outlet tunnel 30 and its O-rings 112 form watertight seals with the walls of fluid outlet tunnel 30 so that fluid flowing up through valve cavity 28 will pass through aperture 76 in first portion, will not be blocked by lobes 86 of second portion, will pass through opening 34 between valve cavity, and up through fluid outlet tunnel 30 and out through spigot tube 18.

FIG. 12 is similar to FIG. 11, except in this view, valve stem 50 has been turned such that second portion 82 has its lobes 86 blocking apertures 76 in first portion, thereby preventing any fluid from flowing from valve cavity 28 through opening 34 and into fluid outlet tunnel 30. In FIG. 11 and FIG. 12, the gasket 100 and fluid supply threaded adapter 42 are not shown being inserted therein for simplicity; however, in operation both gasket 100 and fluid supply thread adapter would be inserted therein to retain valve stem 50, and first and second portions 82 and 72, respectively, of rotary disk valve 70 in place.

FIG. 13 is a perspective side view showing an exemplary filter unit 140 of the invention. Filter unit 140 has a filter cannister 142, a filter 144 which is sized to be retained within a cavity 146 in the filter cannister 142, and an adapter 148. Filter cannister 142 has a fluid inlet end 150 and an open mouth 152 with a preferably threaded perimeter 154. Adapter 148 has a matching threaded surface (not shown) which screwably engages with threaded perimeter 154 of cannister 142. Adapter 148 has an engagement end 156 which is adapted to engaged with engagement 36 of spigot body 16.

Turning to FIG. 14, there is shown a bottom plan view of filter 144. Standoffs 158 can be formed on a bottom 160 of filter so that when filter is placed in cavity 146 of filter cannister 142, fluid will be able to flow up through fluid inlet in and around outside of filter through filter and out through engagement 156 of adapter 148 thereby providing for filtered fluid. Alternatively, instead of standoffs at 158 being formed on bottom 160 of filter, standoffs can be formed on a bottom surface of filter cannister's cavity 146.

Figure 15:
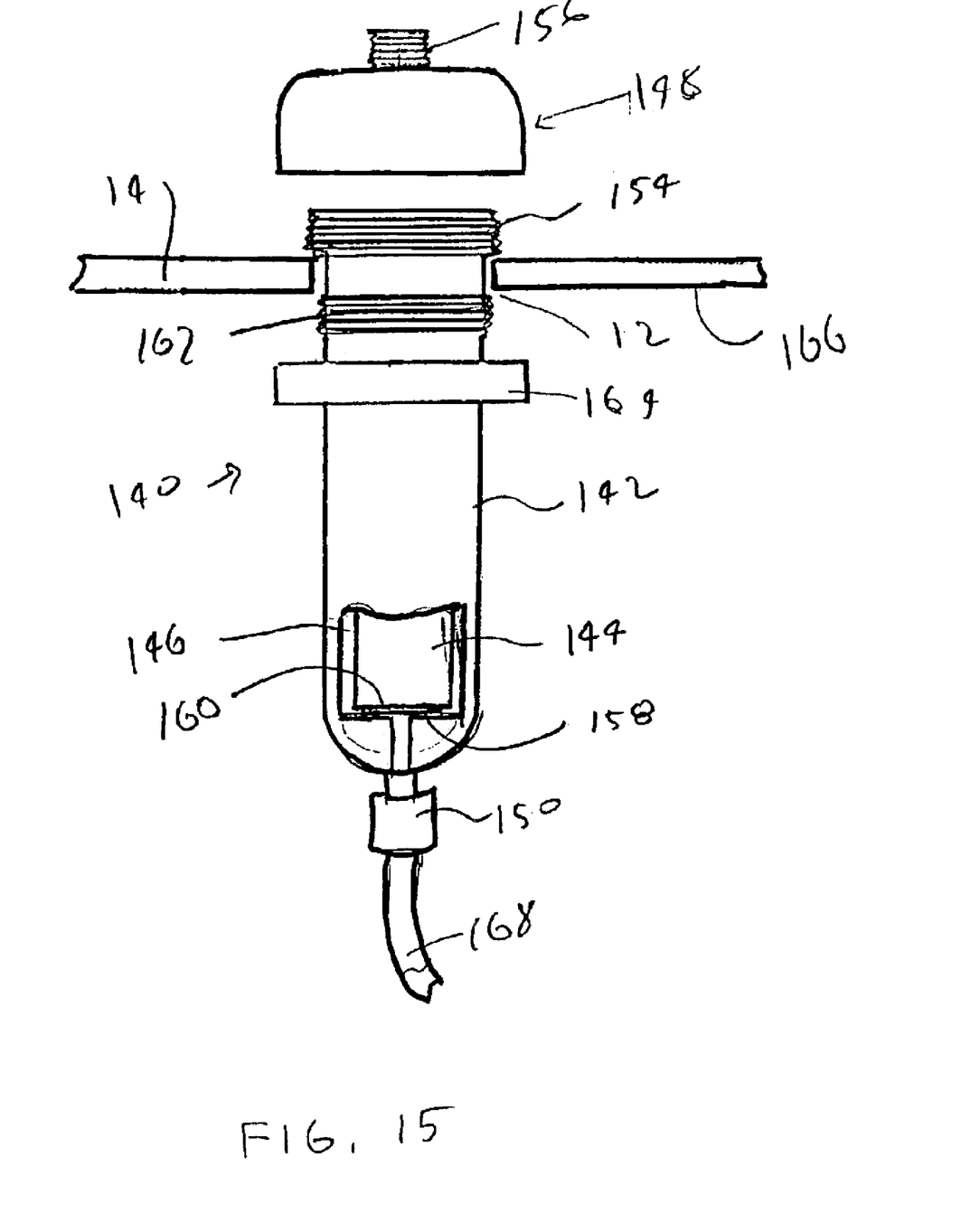
FIG. 15 is a partially exposed view of the filter unit of FIG. 13 in its assembled position inserted through a hole in a sink.

Turning to FIG. 15, there is shown filter unit 140 in the process of being installed through a hole 12 in a sink 14. Filter cannister 142 has a second threaded region 162 below threaded mouth portion 154. A threaded ring 164 with a female threaded aperture will engage with second threaded rings 162 after filter cannister 142 is inserted through a top of the sink's hole 12. Thereafter, the ring 164 can be threaded from below the top of the sink into engagement with a bottom surface 166 of the sink's rim 14, thereby retaining the filter cannister in place. Also as shown, threaded mouth 154 is sized larger than the size of hole 12, thereby preventing filter cannister 142 from being pulled down and out of hole 12. A fluid supply line 168 can be attached to the fluid inlet end 150 of filter cannister. After installing the filter cannister 152, a user, by simply unscrewing the adapter 148, can easily replace the filter 144 without having to reach under the sink, which can be difficult at times.

Figure 16:
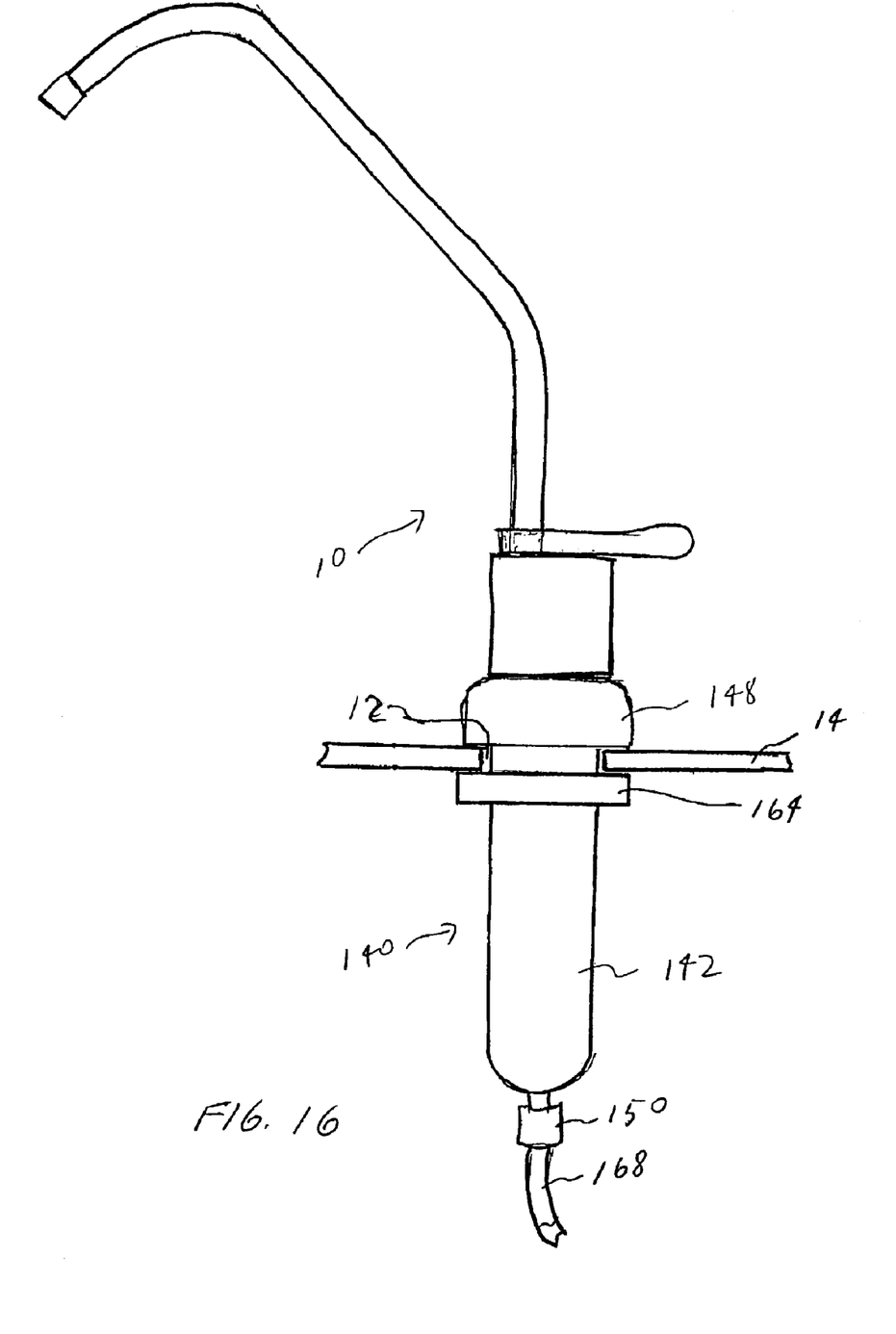
FIG. 16 is a side view of the exemplary fluid spigot used with the exemplary filter unit in a sink hole.

Lastly, FIG. 16 shows an exemplary fluid spigot 10 attached to adapter 148 of the filter unit 142, with threaded ring 164 holding filter cannister 142 in place in hole 12 of a sink 14, a countertop, or any other surface. Again, a user can, by simply unscrewing spigot 10 and if attached adapter 148 from threaded mouth 154 of filter cannister easily gain access to the filter located therein, and replace it without needing to go under the sink or under the counter. The filter unit can also be attached to other faucet designs and could be formed as part of a escutcheon of a faucet.

The drawings in the foregoing description are not intended to represent the only form of the invention in regard to the details of its construction and manner of operation. In fact, it will be evident to one skilled in the art that modifications and variations can be made without departing from the spirit and scope of the invention. Although specific terms have been employed, they are intended in a generic and descriptive sense only and not for purposes of limitation.

What is claimed is:

1. A fluid spigot and filter unit comprising a fluid spigot having:

a spigot body having a valve stem tunnel, a fluid outlet tunnel, a valve cavity, and an opening between the fluid outlet tunnel and the valve cavity;

a rotary disc valve, comprising a first portion and a second portion, the first portion having at least one aperture formed therethrough, the second portion having a blocking region that will cover the at least one aperture in the first portion when the first and second portions are in a first, closed orientation, with the region at least partially uncover the at least one aperture in the first portion when the first and second portions are in a second, opened orientation, the rotary disc valve being located in the valve cavity;

a valve stem that is inserted into the valve seat cavity and through the valve stem tunnel, the valve stem having an upper, turning end and a lower engagement end which engages with and turns one of the first and second portions of the rotary disc valve; and a handle that engages with the upper, turning end of the valve stem; and a filter unit comprising:

a filter cannister with a hollow body with a fluid inlet and an open mouth portion;

a filter sized to fit within the filter cannister; and an adapter that fits over the open mouth portion of the filter canister and has engagement for connecting to the spigot body.

2. The fluid spigot of claim 1, wherein the filter cannister's open mouth portion is male threaded and has a larger diameter than the hollow body, and wherein the adapted is female threaded and engages with the cannister's male threaded open mouth.

3. The fluid spigot of claim 1, wherein the filter cannister is sized to fit through a hole in a sink rim, to permit the filter to be replaced from above the sink by removing the adapter to access the filter.

4. A fluid spigot and a filter unit, comprising a fluid spigot having:
- a spigot body having a valve stem tunnel, a fluid outlet tunnel, a valve cavity, and an opening between the fluid outlet tunnel and the valve cavity;
- a rotary disc valve, comprising a first portion and a second portion, the first portion having at least one aperture formed therethrough, the second portion having a blocking region that will cover the at least one aperture in the first portion when the first and second portions are in a first, closed orientation, with the region at least partially uncover the at least one aperture in the first portion when the first and second portions are in a second, opened orientation, the rotary disc valve being located in the valve cavity;
- a valve stem that is inserted into the valve seat cavity and through the valve stem tunnel, the valve stem having an upper, turning end and a lower engagement end which engages with and turns one of the first and second portions of the rotary disc valve;
- a handle that engages with the upper, turning end of the valve stem; and
- a spigot tube that is inserted into the fluid outlet tunnel; and
- a filter unit, comprising:
- a filter cannister with a hollow body with a fluid inlet and an open mouth portion;
- a filter sized to fit within the filter cannister; and
- an adapter that fits over the open mouth portion of the filter canister and has engagement for connecting to the spigot body.

5. The fluid spigot of claim 4, wherein the filter cannister's open mouth portion is male threaded and has a larger diameter than the hollow body, and wherein the adapted is female threaded and engages with the cannister's male threaded open mouth.

6. The fluid spigot of claim 4, wherein the filter cannister is sized to fit through a hole in a sink rim, to permit the filter to be replaced from above the sink by removing the adapter to access the filter.

7. A fluid spigot, comprising:
- a spigot body having a valve stem tunnel, a fluid outlet tunnel, a valve cavity, and an opening between the fluid outlet tunnel and the valve cavity;
- a rotary disc valve, comprising a first portion and a second portion, the first portion having at least one aperture formed therethrough, the second portion having a blocking region that will cover the at least one aperture in the first portion when the first and second portions are in a first, closed orientation, with the region at least partially uncover the at least one aperture in the first portion when the first and second portions are in a second, opened orientation, the rotary disc valve being located in the valve cavity;
- a valve stem that is inserted into the valve seat cavity and through the valve stem tunnel, the valve stem having an upper, turning end and a lower engagement end which engages with and turns one of the first and second portions of the rotary disc valve;
- a handle that engages with the upper, turning end of the valve stem;
- a spigot tube that is inserted into the fluid outlet tunnel; and
- a filter unit with a filter cannister with a hollow body with a fluid inlet and an open mouth portion, a filter sized to fit within the filter cannister, and an adapter that fits over the open mouth portion of the filter canister and has an engagement for removable attachment to the spigot body.

8. A combination fluid spigot and water filter, comprising:
- a spigot body;
- a valve located in the spigot body;
- a valve activation handle;
- a spigot tube that extends from the spigot body; and
- a filter unit, the filter unit having a filter cannister with a hollow body with a fluid inlet and an open mouth portion, a filter sized to fit within the filter cannister, and an adapter that fits over the open mouth portion of the filter canister, wherein the filter cannister is sized to fit through a hole in a sink rim, the filter being replaceable from above the sink by removing the adapter to access the filter.

9. The filter unit of claim 8, wherein the filter cannister's open mouth is male threaded and has a larger diameter than the hollow body, and wherein the adapted has a female threaded end that engages with the cannister's male threaded open mouth, and another end that engages with the spigot body.

* * * * *